Figure 6:
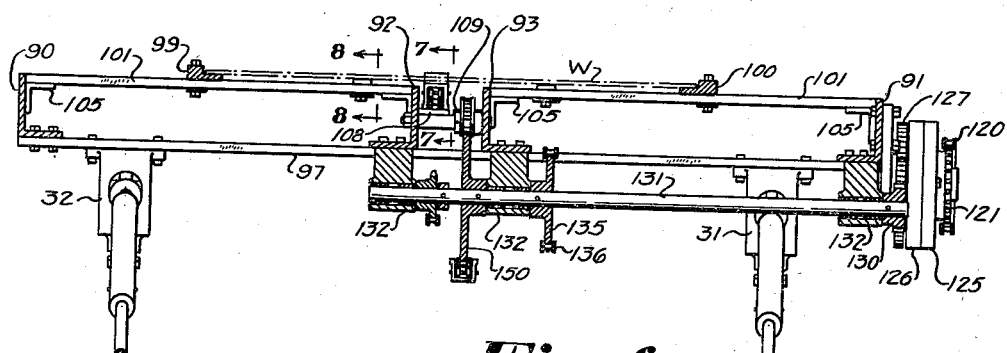

Feb. 10, 1942.  E. W. HAMANT  2,272,461
SURFACE DECORATING MECHANISM
Filed Dec. 8, 1939  3 Sheets-Sheet 1
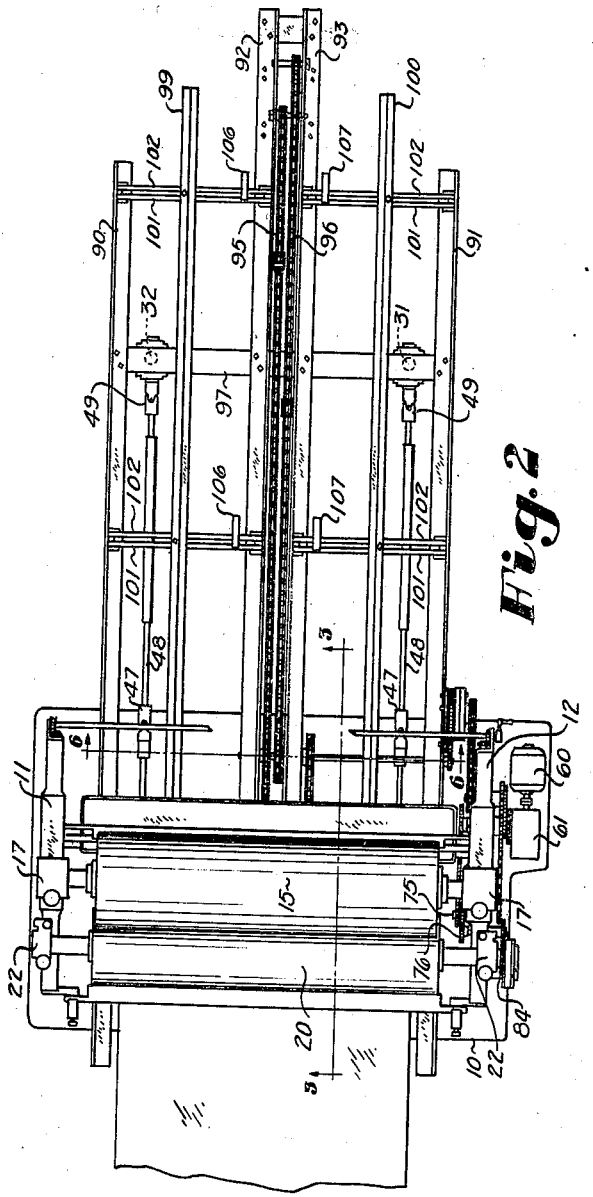
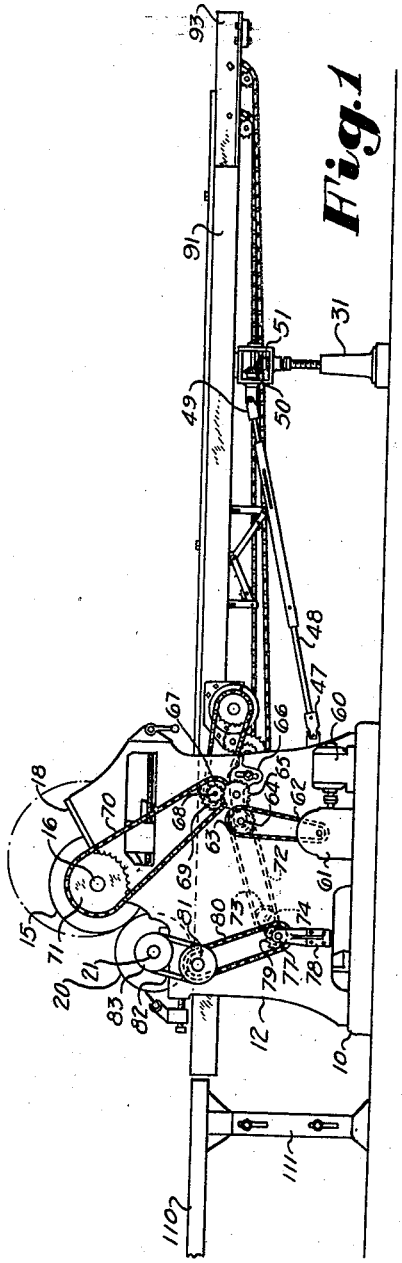
INVENTOR.
EDWARD W. HAMANT
BY
ATTORNEYS Feb. 10, 1942.  E. W. HAMANT  2,272,461
SURFACE DECORATING MECHANISM
Filed Dec. 8, 1939  3 Sheets-Sheet 2
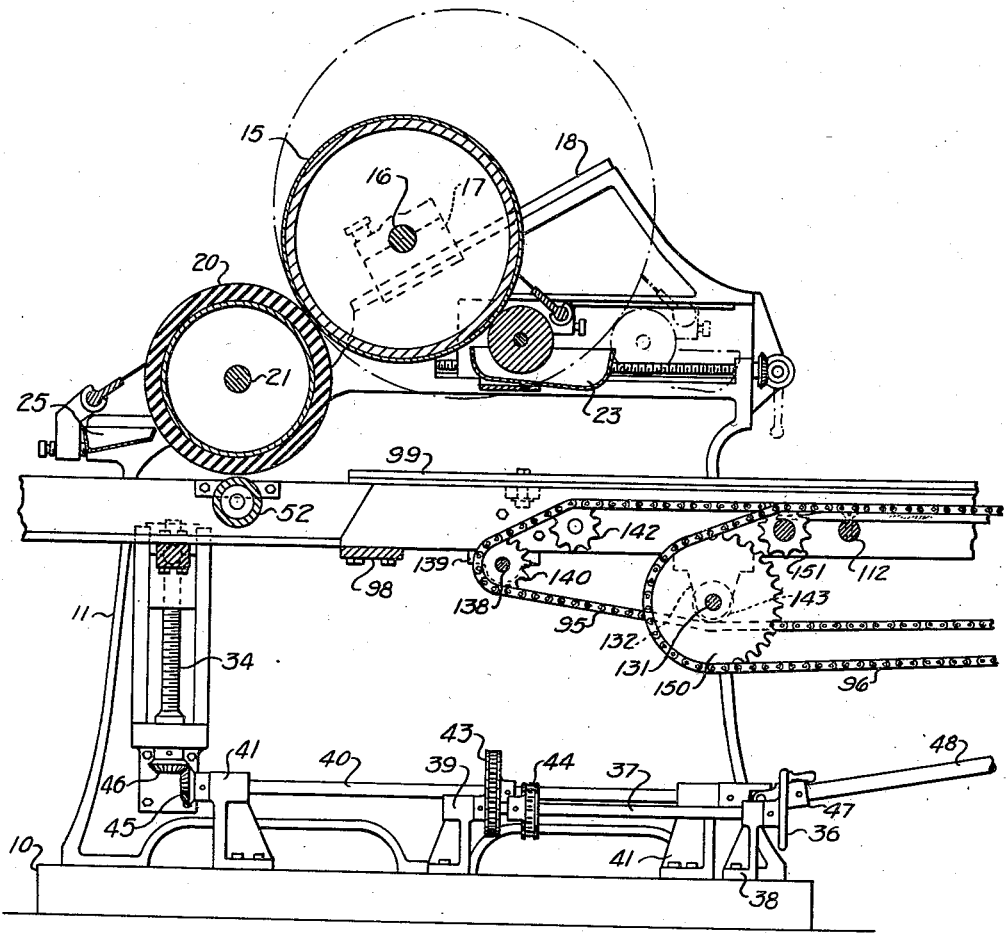
Fig. 3
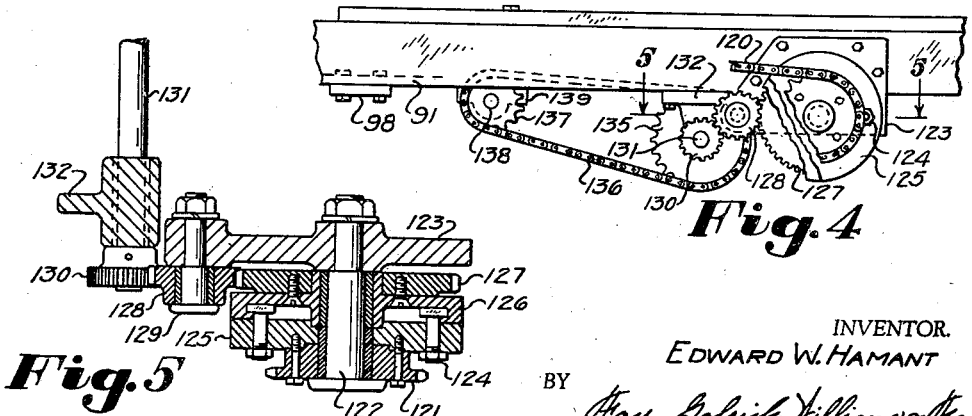
Fig. 4
Fig. 5
INVENTOR.
EDWARD W. HAMANT
BY
ATTORNEYS.

INVENTOR.
EDWARD W. HAMANT

Patented Feb. 10, 1942

2,272,461

UNITED STATES PATENT OFFICE 2,272,461

SURFACE DECORATING MECHANISM

Edward William Hamant, Dayton, Ohio, assignor to Oxford Varnish Corporation, Detroit, Mich., a corporation of Michigan Application December 8, 1939, Serial No. 308,194

5 Claims. (Cl. 101—154)

This invention is directed to improvements in graining machines of the general type disclosed in United States Patent No. 1,894,966, issued to the assignee of the present application on the 24th day of January, 1933, and the general object thereof is to provide an associated machine driving and conveyor driving mechanism, so arranged that the machine can be utilized for the graining of symmetrical designs upon articles of manufacture, such as furniture panels, door panels, wall boards and elongated products which have an overall surface to be decorated that is greater in length than the circumference of the cylinder of the machine which carries the engraved design.

The type of machine disclosed in the patent above referred to, has proved to be of great utility in the effecting of wood grain designs and other designs, on large, flat objects, such as wall board panels, steel panels, and, in fact, various products of manufacture which are of considerable dimension and the entire face of which is to be wood grained or decorated. The machine is adaptable to the utilization of a grained cylinder of varying diameters and change-overs can be effected and new set-ups arranged in a rapid manner.

However, frequently it has occurred in the past that when designs having more or less symmetrical appearance, such as butt-walnut and butt veneers of other woods, wood inlays, and so forth, were being reproduced, considerable difficulty was encountered in obtaining proper registration of the take-off or transfer roll which is applied to the work being decorated.

Wherefore the present invention is more specifically concerned with the arrangement of a conveyor mechanism and drive therefor in an associated manner with the drive mechanism of the engraved cylinder of a machine of the type referred to.

One of the objects of the present invention is to so arrange such mechanisms that the cooperating elements thereof can be expeditiously set and adjusted in timed movement relative to the rotation of the cylinder regardless of the diameter of the cylinder and to effect the feeding of the work or panels of material to the transfer roll, in such manner that the designs will, under all conditions, be applied in symmetrically to the entire surface of the work being decorated.

Other objects of the present invention will be apparent to those skilled in the art from the following description of a machine embodying the invention, and which description refers to the accompanying drawings. Such objects will be summarized in the claims.

Figure 7:
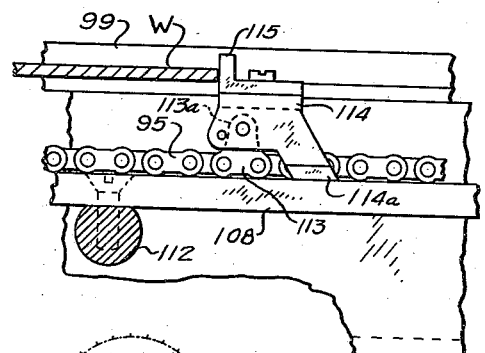
Figure 8:
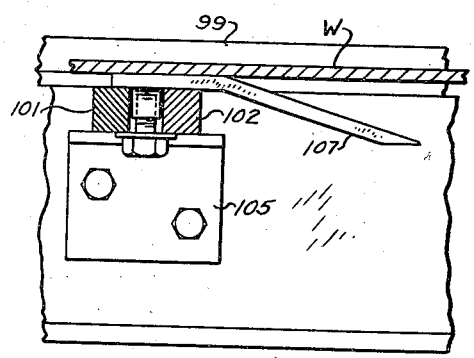
Figure 9:
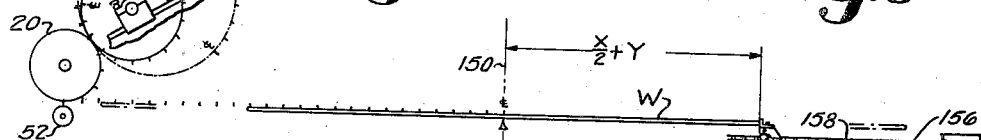
Figure 10:
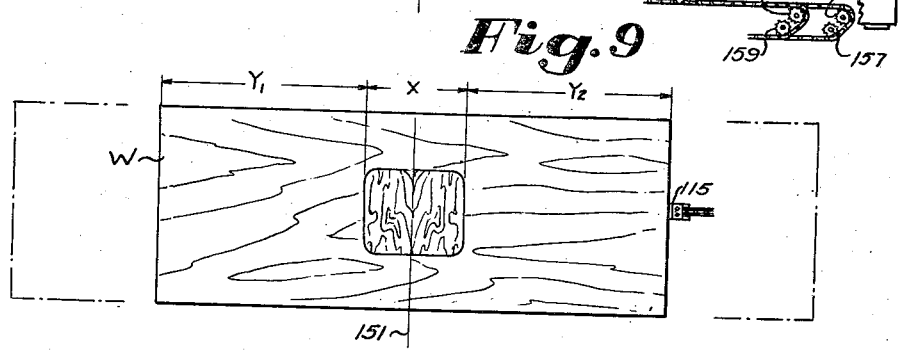

In the drawings, Fig. 1 is a side elevation of a machine embodying the features of my invention; Fig. 2 is a top plan view of the machine shown in Fig. 1; Fig. 3 is an enlarged cross-sectional elevation taken substantially along the line 3—3 of Fig. 2; Fig. 4 is an enlarged fragmentary detailed view of a driving connection between the means for driving the pattern roll of the machine and a work conveying and feeding mechanism; Fig. 5 is a cross-sectional view taken substantially along the line 5—5 of Fig. 4; Fig. 6 is a transverse cross-sectional view taken substantially along the line 6—6 of Fig. 2; Fig. 7 is an enlarged fragmentary cross-sectional view taken substantially along the line 7—7 of Fig. 6; Fig. 8 is a similar view taken substantially along the line 8—8 of Fig. 6; Fig. 9 is a diagrammatic elevational view showing the relation of the pattern and transfer roll and a specific workpiece or panel to be decorated, when positioned upon the work feeding mechanism; and Fig. 10 is a diagrammatic plan view of the workpiece and a feeding element diagrammatically illustrated in Fig. 9.

The machine disclosed in the drawings is constructed in such manner that pattern rolls of different diameters may be utilized therein as desired, while the diameter of the transfer roll is the same in all instances of use. The conveyor mechanism comprises generally a horizontally disposed frame structure which is vertically adjustable to adapt the use of the same to workpieces of varying thicknesses. The work feeding mechanism comprises an endless chain mechnism, which, in the present embodiment, comprises a feed belt or chain having an over-all length which is a multiple of the circumference of the pattern roll, and in the present instance the machine is disclosed with the conveyor mechanism embodying two such endless chain mechanisms, one chain being the multiple, by way of illustration, of a pattern roll having a diameter of 15⅛ inches, while the other chain mechanism has a length comprising a multiple of a cylinder or pattern roll having a diameter of 24⅜ inches. The chain mechanism functions as endless feed belt, and has equi-distantly fixed thereto work-engaging lugs, the distance between the lugs being equal to or a multiple of the circumference of the pattern roll. Only one chain mechanism is utilized at any given time. The arrangement of the driving mechanism for driving the transfer and pattern rolls and for driving the chain mechanism is such that an adjustment can be effected between the relative positions of a given point on the pattern roll and a lug on the chain feed mechanism, whereby the timing of the feed relative to the rotation of the pattern roll and the transfer roll can be made so that a panel, a board or other piece of work of large area can be grained or finished with the design of the pattern roll symmetrically transferred thereto by the transfer roll.

Referring to the drawings, I will briefly describe the decorating means. Referring to Figs. 1, 2 and 3 I show a machine frame comprising a base 10 and side frame members 11 and 12 mounted thereon, the side frame members having the top portions thereof connected by crosspieces (not shown) comprising part of the frame of the machine. A pattern roll 15, which may comprise an etched cylinder or other printing form, is mounted upon a shaft 16 and the shaft 16 is carried by adjustable bearing blocks 17 supported upon guideways 18 formed on the side frame members 11 and 12. A transfer roll 20 is carried by a shaft 21 which is mounted in suitable bearings 22 supported by the side frame members 11 and 12. An adjustable ink-applying mechanism generally indicated by the reference numeral 23 is supported by the frame to be adjustable relative to the surface of the pattern roll 15, regardless of the size of the roll. A transfer roll cleaning mechanism is generally indicated by the reference numeral 25, and this mechanism serves to thoroughly clean the surface of the transfer roll upon the rotation thereof.

The work conveyor mechanism comprises a horizontally disposed open frame structure, mounted at one end upon a pair of jack posts 31 and 32, remote from the machine frame, and a pair of jack mechanisms 34, one of the latter being attached to the machine frame member 11 and the other to the machine frame member 12, as indicated in Fig. 3. The jack members 31, 32 and 34 are arranged to be simultaneously adjusted by a hand wheel 36 through shafting and gears, which are as follows:

A hand wheel is mounted upon an outer end of a horizontally extending shaft member 37, supported by bearing members 38 and 39, secured to the base member 10 of the machine frame. A pair of parallel shafts 40 are supported by bearing members 41 secured to the machine frame base 10 and these shaft members are operated in unison by a chain and sprocket mechanism generally indicated at 43 in Fig. 3. One of the shaft members 40 is driven by a chain and sprocket mechanism 44 extending between the hand-operated shaft 37 and one of the shafts 40. The shaft members carry, at one end thereof, bevelled gears 45, which mesh with bevelled gears 46 carried by the screws of the jack mechanisms 34. The other ends of the shaft members 40 are connected to universal joints 47, the joints being connected to telescopic shaft members 48. The outer upper ends of the telescopic shaft members 48 are provided with universal joints 49, which connect through stud shafts (not shown) to bevelled gears 50, which mesh with bevelled gears 51, comprising parts of the jack mechanisms 31 and 32. By turning the hand wheel 36 in the desired direction, the entire conveyor structure may be adjusted upwardly or downwardly to vary the space between a pressure roller 52 (Fig. 3), carried on the inner end of the conveyor structure, and the transfer roll 20.

The conveyor structure proper and the means for driving the pattern and transfer rolls will now be described.

Secured to the frame base 10 is a motor 60 which is connected to a gear reduction mechanism 61 also supported upon the base. The gear reduction mechanism drives a chain 62 which passes upwardly and over a sprocket 63 (see Fig. 1) mounted upon a short shaft 64 carried on the side of the machine frame member 12. Fixed to the shaft 64 is a pinion gear (not shown) which meshes with an intermediate gear 65 carried on an adjustable bracket 66. The intermediate gear 65 meshes with a pinion 67, and is mounted upon a shaft 68 supported by the machine frame member 12. Fixed to the outer end of the shaft 68 is a sprocket 69 that drives the chain 70. The chain 70 passes upwardly and over a sprocket 71 carried by the pattern roll shaft 16.

The drive for the transfer roll 20 comprises a sprocket member (not shown) mounted upon the inner end of the stub shaft 64 which sprocket drives a chain 72. The chain 72 passes over a sprocket 73 and sprocket 73 drives a pinion 74. The pinion 74 and sprocket 73 are mounted upon a stub shaft 75, mounted upon the inside face of the frame member 12. The pinion 74 drives a gear 76 (see Fig. 2) carried by a stud shaft 77 which extends through the machine frame member 12 and has the outer end thereof supported by a bearing bracket 78 mounted on the frame member 12. The shaft 77 carries a sprocket 79 which drives an upwardly extending chain 80 and the chain 80, through a suitable sprocket 84 drives an adjustable feed pulley 81, a feed belt 82 and an adjustable feed pulley 83 secured to the transfer roll shaft 21. The arrangement of the sprockets and gearing mechanisms just described for driving the pattern roll and the transfer roll are such that the peripheral speeds of the pattern roll and of the transfer roll will be substantially the same and by reason of the speed change pulleys 81 and 83 accurate synchronization of the peripheral speeds of the pattern roll and transfer roll can be obtained.

The drive arrangement is such that the shaft member 68, from which both roll drives are taken, makes two revolutions for one revolution of the pattern roll 15, and it should be noted that all of the foregoing described driving mechanisms are carried or supported by the machine frame.

The conveyor structure may be built of any desired elements, but in the structure shown the work conveyor is constructed primarily of angle iron and cross members in the form of an open frame, comprising outer angle members 90 and 91 arranged to face inwardly and upwardly toward the work and centrally disposed angle members 92 and 93 of the same size arranged back to back and spaced apart whereby work feed chain stretches 95 and 96 of considerable length may be operatively disposed therebetween. The four angle members 90, 91, 92 and 93 extend in parallel relation substantially the length of the conveyor structure, and are of the same cross-sectional dimensions as shown in Fig. 6. The bottom flanges of the four angle members are secured in spaced relation to a cross-bar 97, to the underside of which the jack mechanisms 31 and 32 are secured, and a cross-bar 98 is attached to said angle members near the inner machine ends thereof.

The work supporting surface of the conveyor structure may comprise a pair of longitudinally extending L-shaped members 99 and 100, upon which the worksheets slide and rest. The members 99 and 100 are adjustably secured to and rest upon spaced-apart pairs of cross-bars 101 and 102, arranged transversely of the conveyor structure. For the purpose of supporting wide sheets of workpieces which have a tendency to sag, I provide additional slideway members 106 and 107, which may be adjustably mounted upon a pair of cross-bars 101 and 102. It will be noted in Fig. 6 that the cross-bars 101 and 102 are joined to the longitudinally extending angle members 90, 91, 92 and 93 by angle brackets 105. Hence, the work guiding members 99 and 100 and the supporting strips 106 and 107 can be adjusted to work of any width within the capacity of the machine. An adjustable work-receiving table 110 is arranged at the end of the conveyor mechanism upon adjustable legs 111 and comprises no part of the present invention.

The work feeding mechanism and the means for joining the same in adjusted timed relation to the rotation of the pattern will now be described.

The chain feed arrangement shown in the present embodiment comprises a chain stretch 95 which is adapted for feeding the work when a small sized cylinder, such as 15⅛ inch diameter cylinder or pattern roll is used, and a chain stretch 96, which is operatively conditioned when a larger cylinder, such as a pattern roll having a diameter of 24⅜ inches is used. The chains 95 and 96 slide over slideway bars 108 and 109, respectively. These bars are disposed between the longitudinally extending angle members 92 and 93 and are supported upon cross-bars 112, which also serve as spacer members for the angle members 92 and 93. The bars 108 and 109 are disposed below the slideway members 99 and 100 and the chain members 95 and 96 are provided with equidistantly spaced chain links 113, having upwardly extending lugs 113a, which afford a pivot connection for lug carriers 114, upon which are detachably connected work-engaging lugs 115. The work engaging lugs 115 extend above the work supporting surfaces of the slideway members 99, 100, 106 and 107, as shown in Fig. 7, and are adapted to engage the outer ends of the workpieces and push the same along the slideway members 99 and 100 toward the transfer roll 20 and pressure roll 52, as shown in Fig. 7. The outer pair of the slideway bars 106 and 107 may be provided with camming portions, as shown in Fig. 8, which portions serve to facilitate the guiding of the worksheets. Slide shoes 114a on the lug carriers 114, steady the lug carriers on the slide bars 108 and 109 so that the lugs 115 are maintained in the work-engaging position shown in Fig. 7, as the chain stretches are moved toward the transfer roll 20.

The drive for the work feed chains 95 and 96 comprises a sprocket drive taken from the described shaft 68 and may be in the form of a sprocket driving a chain 120, which drives a sprocket member 121 mounted upon a stud shaft 122 carried by a bearing bracket 123 attached to the outer side of the angle member 91 of the conveyor structure. The sprocket member 121 is part of an angularly adjustable means for changing or adjusting the feed lug positions relative to any desired point on the surface of the pattern roll and is secured to a disk member 125. The disk member 125 is adjustably secured to a companion disk member 126. Clamp bolts 124, the heads of which engage in an annular groove formed in the disk member 126, serve to drivingly secure the two disk members together in any adjusted position. Secured to the disk member 126 is a gear member 127 which drives an intermediate gear 128, the intermediate gear 128 being carried by a stud member 129 supported by the bracket member 123. The intermediate gear member drives a gear member 130, carried upon the outer end of a transversely extending shaft member 131. The shaft member 131 is supported by depending bearing brackets 132 secured to the undersides of the angle members 91, 92 and 93. A sprocket member 135 is secured to the shaft 131 near the longitudinal center of the conveyor structure, as shown in Fig. 6. The sprocket member 135 (see Fig. 4), drives a chain 136, which passes over a pinion sprocket 137 carried by a shaft 138, suitably mounted in bearing members 139 attached to the underside of the angle members 92 and 93 near the inner ends thereof. The shaft 138 carries a small sprocket 140 which drives the work feed chain 95. An idler sprocket 142 serves to align the feed chain 95 with the slideway rest bar 110 and a second idler sprocket 143 mounted upon the shaft 131 serves to guide the lower reach of the chain 95 beneath the shaft 131. The chain 96 is driven by a sprocket 150 carried by the shaft 131 and an idler sprocket 151 serves to align the top reach of the chain 96 in operative relation with the slideway bar 111. The outer end of the feed chain 95 passes over a pair of idler sprockets 156 and 157, diagrammatically indicated in Fig. 8, and the outer end of chain 96 passes over a similar pair of idler sprockets 158 and 159, these respective pairs of sprockets being suitably mounted between the two angle members 92 and 93 at the outer end of the conveyor structure.

As previously stated, the overall length of the feed chain 95 is a multiple of the circumference of the pattern cylinder 15. Likewise, the overall length of the feed chain member 96 has an overall length which is a multiple of a larger pattern cylinder, and the work engaging lugs 115 carried by the respective feed chain members are equidistantly spaced on the feed chain members. By arranging a gear and chain drive connection between the transfer roll, the pattern roll and the work feeding chains or belts, it is possible to locate a definitely fixed position upon the conveyor structure relative to which the transverse center line of a workpiece can be registered and which will bear a definite relationship to the center line of the design upon the pattern roll 15. In Figs. 9 and 10 this set-up relationship is shown and the workpiece is designated by the reference character W. When once a point or line 150 is located upon the conveyor structure in a position as above stated, the feed chain can be adjusted to feed workpieces of different lengths as long as the pattern cylinder diameter remains the same. For example, the workpiece, which is illustrated in Fig. 10 as being an elongated board, is to receive a symmetrically arranged woodgrain design with an inlay, is placed upon the guideway members 99 and 100 with the transverse center line 151 thereof in registration with the marked point or line 150. By loosening the bolt members 124 (Fig. 5) a shifting of the feed chain member to bring one of the lugs 115 into contact with the outer end of the workpiece or board W can then be effected. The pattern roll and transfer roll are held stationary during such shifting movement of the feed chain. When such adjustment relative to the positioned workpiece has been made, the bolt members are then tightened, whereupon the rotating relation of all of the sprockets, rolls, etc., become fixed and the center of the workpiece will always register with the center of the inlay design which is transferred from the pattern roll to the transfer roll and from the transfer roll to the workpiece surface. In such a set-up the lugs 115 on the feed chain which is not functioning as the feeding means, can be removed. However, the chain set-up arrangement can be made when a pattern roll of larger diameter is used for the registration can be maintained in the same manner, regardless of the length of the workpiece providing the length of the workpiece is not greater than twice the circumference of the pattern roll minus the length of the inlay. Many variations of this set-up for work pieces of less length are obtainable.

In the diagram shown in Figs. 9 and 10 a set-up for a 15⅛" cylinder or pattern roll 15 is illustrated, where the workpiece has a length of 80 inches and the design is to be applied thereto in symmetrical manner, as illustrated in Fig. 10. The circumference of the 15⅛" cylinder is about 47½" and the inlay designated by X is about 7½", thus leaving the dimensions Y1 and Y2 to be 36¼". The lugs 115 are spaced on the chain a distance twice the circumference of the pattern roll, (the intermediate lugs having been removed) that is 95" and the excess length of the workpiece W relative to the circumference is 32½". Thus the pattern roll in making the impression shown in Fig. 10 will bear such rotative relation to the linear movement of the workpiece that the area represented by the character Y1 will be printed before the inlay X is printed and thereafter and by an overrun of the pattern roll the area represented by the character Y2 will be printed, while the pattern roll is rotated more than 1⅔ revolutions. It will be obvious that the dimension or diameter of the transfer roll does not enter into the definite fixed linear movement relationship of the pattern roll circumference and the workpiece. It will be obvious that when workpieces having a length which is less than the circumference of the pattern roll are to be decorated, the lugs 115 will be spaced 47½" apart on the chain 95. Should a duplex design be placed upon the pattern roll for workpieces which are less than one-half the circumference of the pattern roll, the distance between the lugs could be reduced to one-half of the circumference of the pattern roll while permitting the obtaining of the desired registration of the workpieces with the pattern roll, as above described.

The station or line indicated by the reference numeral 150 may comprise an indicator plate or marker on the conveyor and may be shifted to the initially desired place at the time the original assembly of the conveyor is made.

The entire construction is such as to permit of a wide range of adjustment for the decoration of workpieces of varying lengths, widths and thicknesses, and it is to be understood that the present invention is not limited to the particular embodiment shown, other than as restricted in the claims appended hereto.

I claim:

1. In a device of the character described, the combination of a roll for performing work upon sheet material, a pair of guideways adapted for engaging the edges of the material for guiding the same to said roll, a conveyor for actuating the material along said guideways, and means between said guideways for preventing sagging of the material, said means being relatively short as compared to said guideways and presenting at the roll remote end thereof downwardly extending cam surface adapted for engaging the forward edge of the material and camming the same into an elevated out-of-sag position.

2. In a device of the character described, a pattern roll and a transfer roll, inking means for said pattern roll, cleansing means for said rolls, in combination with a conveyor adapted for feeding sheet material to said pattern roll for performing work on said material, and means for preventing sagging of the material, said means being relatively short as compared to said guideways and presenting at the roll remote end thereof a downwardly extending cam surface adapted for engaging the forward edge of the material and camming the same into an elevated out-of-sag position.

3. In a device of the character described, the combination of a pattern roll, a transfer roll, a base for supporting said rolls, conveyor means for conveying work to said transfer roll, vertically adjustable means supported by said base for supporting said conveyor means, and a pressure roll carried by said conveyor means for cooperating with said transfer roll, whereby actuation of said adjustable means spaces said pressure roll from said transfer roll.

4. In a device of the character described, the combination of a pattern roll, a transfer roll cooperating with said pattern roll, a pressure roll establishing a bite with said transfer roll, a conveyor including spaced slideways for conveying sheets to said bite, and an element extending between said slideways and spaced a substantial distance from said bite, the bite remote end of said element having a cam surface for camming said sheets into an elevated out-of-sag position.

5. In a device of the character described, the combination of a pattern roll, a transfer roll cooperating with said pattern roll, a pressure roll establishing a bite with said transfer roll, a conveyor including spaced slideways for conveying sheets to said bite, and an elongated element extending parallel to and disposed between said slideways, the forward end of said element being a substantial distance from said bite and providing a cam surface commencing below and terminating substantially flush with said slideways, said surface being adapted for engaging a sagged sheet and camming the same into out-of-sag position.

EDWARD WILLIAM HAMANT.